United States Patent
Ishikawa

(10) Patent No.: US 11,553,134 B2
(45) Date of Patent: Jan. 10, 2023

(54) IMAGE STABILIZING APPARATUS AND IMAGE PICKUP APPARATUS

(71) Applicant: CANON KABUSHIKI KAISHA, Tokyo (JP)

(72) Inventor: Shimpei Ishikawa, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/322,554

(22) Filed: May 17, 2021

(65) Prior Publication Data

US 2021/0368101 A1 Nov. 25, 2021

(30) Foreign Application Priority Data

May 20, 2020 (JP) .............................. JP2020-088294

(51) Int. Cl.
*H04N 5/225* (2006.01)
*H04N 5/232* (2006.01)
*G03B 5/00* (2021.01)

(52) U.S. Cl.
CPC ........... *H04N 5/23287* (2013.01); *G03B 5/00* (2013.01)

(58) Field of Classification Search
CPC ................................................. H04N 5/22521
USPC ....................................................... 348/374
See application file for complete search history.

(56) References Cited

U.S. PATENT DOCUMENTS

| | | | | |
|---|---|---|---|---|
| 10,694,153 | B2* | 6/2020 | Hendricks | G02B 7/022 |
| 2006/0171704 | A1* | 8/2006 | Bingle | B60R 11/04 |
| | | | | 396/419 |
| 2021/0152680 | A1* | 5/2021 | Lee | H04M 1/0266 |
| 2022/0124226 | A1* | 4/2022 | Jeong | H04N 5/2252 |

FOREIGN PATENT DOCUMENTS

JP 2006-352418 A 12/2006

* cited by examiner

*Primary Examiner* — Anthony J Daniels
(74) *Attorney, Agent, or Firm* — Canon U.S.A., Inc. I.P. Division

(57) ABSTRACT

An image stabilizing apparatus includes a first wireless communication unit, a second wireless communication unit configured to communicate with the first wireless communication unit and disposed to face the first wireless communication unit, a first substrate mounted with the first wireless communication unit, a second substrate mounted with the second wireless communication unit, a third substrate provided opposite to the first substrate with respect to the second substrate in an optical axis direction and mounted with an image sensor, and an electromagnetic shield member provided between the second substrate and the third substrate. The image stabilizing apparatus provides an image stabilization by moving the second and third substrates relative to the first substrate in planes formed in directions different from the optical axis.

11 Claims, 5 Drawing Sheets

IMAGE STABILIZING APPARATUS AND IMAGE PICKUP APPARATUS

BACKGROUND

Field of the Disclosure

The present disclosure relates generally to an image stabilizing apparatus, and more particularly to an image stabilizing apparatus that provides an image stabilization by moving an image sensor.

Description of the Related Art

In the conventional image pickup apparatus, one mechanism as an image stabilizing mechanism moves an image sensor for an image stabilization in order to suppress image blurs in a captured image mainly caused by the camera shake of a photographer during imaging.

It is necessary for the image stabilization to connect the image sensor and a control substrate to each other via a cable or flexible printed circuits or flexible substrate (FPC) having a sufficient length in order to flexibly support a movement of the image substrate mounted with the image sensor.

FIG. 5 is a conventional structural diagram showing a horizontally cut section of an image pickup apparatus at the center of an optical axis. An image pickup apparatus 1001 has a conventional structure. A lens unit 1002 is an optical unit configured to condense from an object, and attached to an exterior cover 1003. An image sensor 1004 is an electric component that converts an image of light obtained through the lens unit 1002 into an electric signal, and is mounted on an imaging substrate 1005. A movable frame 1006 holds the imaging substrate 1005. The movable frame 1006 is movably attached to a fixed frame 1008 by a plurality of spheres 1007 in a plane orthogonal to the optical axis in order to achieve the image stabilization. A driving coil (not shown) is attached to the movable frame 1006, and the movable frame 1006 moves when a magnetic field is generated by the current flowing through the driving coil. A control substrate 1009 includes an image processing unit, a control unit for various systems, a power supply circuit unit, and the like. The fixed frame 1008 and the control substrate 1009 are attached to an unillustrated internal housing. An FPC (Flexible Printed Circuits) 1010 is connected to a connector 1010a mounted on the imaging substrate 1005 and a connector 1010b mounted on the control substrate 1009, and the imaging substrate 1005 and the control substrate 1009 are electrically communicable with each other.

The deflection of the FPC 1010 as a movable member including the image sensor 1004 can cause a moving load of the movable member and might impair the accuracy improvement of image stabilization. When the FPC 1010 is made sufficiently long in order to reduce the moving load of the movable member, an accommodation space required for the FPC 1010 can hinder the miniaturization of the image pickup apparatus.

Japanese Patent Laid-Open No. ("JP") 2006-352418 proposes a means in which each of the imaging substrate and the control substrate is mounted with a mutually communicable wireless communication unit so as to minimize the above cable and FPC, and to reduce the load caused by the deflection of it.

Nevertheless, the prior art disclosed in JP 2006-352418 can add noise to the captured image due to the noise in the electric signal obtained by the image sensor caused by the electromagnetic field noise from the wireless communication unit.

SUMMARY

The present disclosure provides an image stabilizing apparatus that can suppress a noise in an image signal caused by wireless communications between substrates.

An image stabilizing apparatus according to one aspect of the present disclosure includes a first wireless communication unit, a second wireless communication unit configured to communicate with the first wireless communication unit and disposed to face the first wireless communication unit, a first substrate mounted with the first wireless communication unit, a second substrate mounted with the second wireless communication unit, a third substrate provided opposite to the first substrate with respect to the second substrate in an optical axis direction and mounted with an image sensor, and an electromagnetic shield member provided between the second substrate and the third substrate. The image stabilizing apparatus provides an image stabilization by moving the second and third substrates relative to the first substrate in planes formed in directions different from the optical axis.

An image pickup apparatus having the above image stabilizing apparatus also constitutes another aspect of the present disclosure.

Further features of the present disclosure will become apparent from the following description of exemplary embodiments with reference to the attached drawings.

DESCRIPTION OF THE EMBODIMENTS

Figure 1:
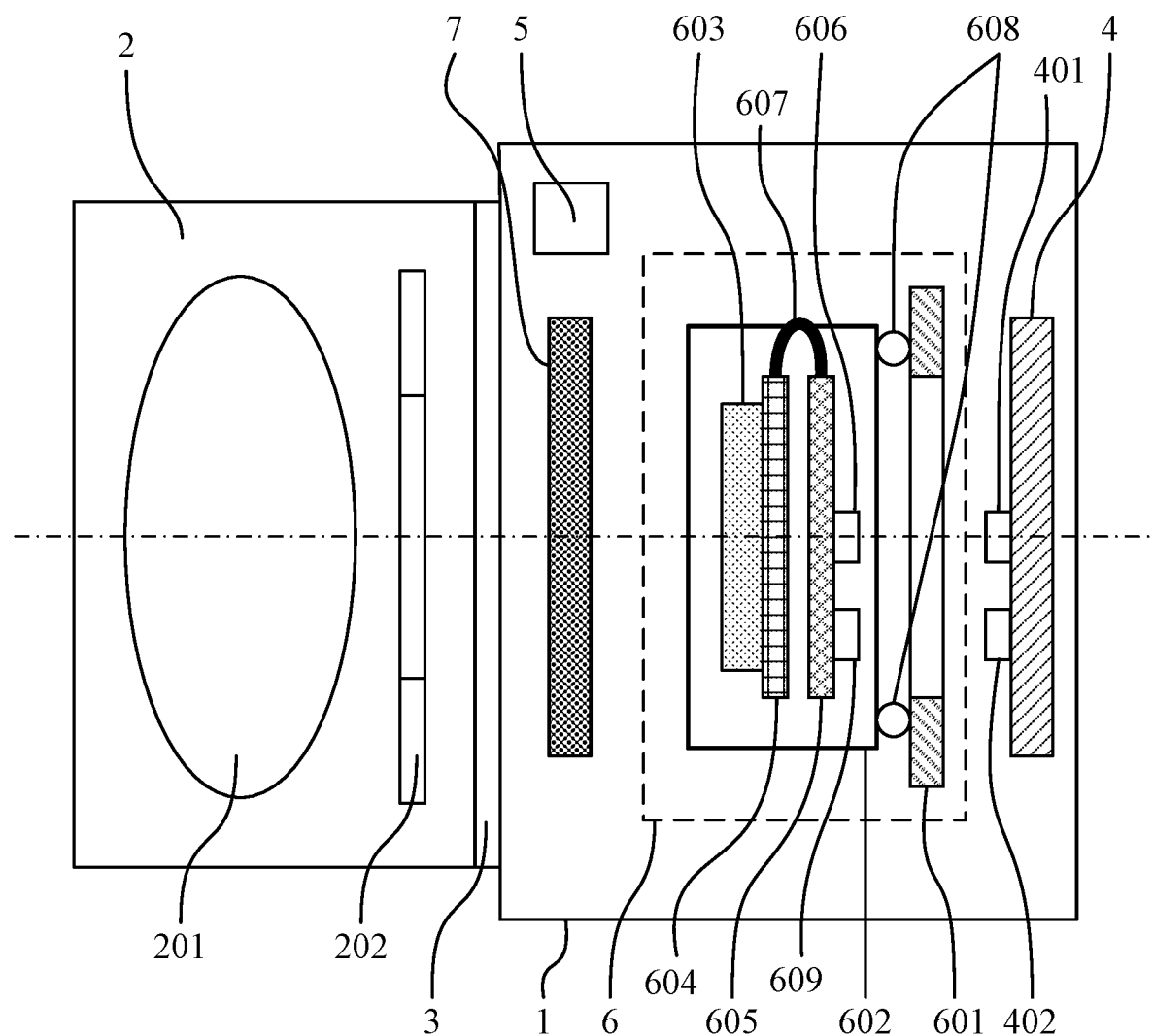
FIG. 1 is a schematic sectional view showing a system configuration of a camera according to this embodiment.

Referring now to the accompanying drawings, a detailed description will be given of embodiments according to the present disclosure. FIG. 1 is a schematic sectional view illustrating a system configuration of a digital single-lens reflex camera according to this embodiment of the present disclosure.

Reference numeral 1 denotes a camera body (image pickup apparatus), and reference numeral 2 denotes an imaging lens that is detachably attached to the camera body 1. The imaging lens 2 includes an imaging optical system 201 and a diaphragm (aperture stop) 202 that adjusts an exposure amount. Although the imaging optical system 201 is represented as a single lens in FIG. 1, it is actually an optical system including a plurality of lens units. The imaging lens 2 is electrically and mechanically connected to the camera body 1 via a mount 3. The imaging lens 2 provides focusing of the imaging optical system 201 by moving a focus lens, which is part of the imaging optical system 201, in an imaging optical axis direction via an illustrated driving mechanism.

A control substrate 4 (first substrate) is a printed wiring board (PWB), which includes a power supply circuit unit, an image processing unit, a control unit for various systems, and the like, and controls the entire camera body 1. The control substrate 4 is fixed to an unillustrated housing of the camera body 1. A first wireless communication unit 401 is mounted on the control substrate 4 so that the center of a first wireless communication unit 401 overlaps the center of the optical axis. The center of the first wireless communication unit 401 and the center of the optical axis do not have to exactly overlap each other. Part of the first wireless communication unit 401 may overlap with the optical axis (and this is similarly applied to the following description).

A shake detecting sensor 5 detects a shake of the camera body 1 caused by manual and body shakes of the user, or the like. The shake detecting sensor 5 uses an angular velocity sensor such as a gyro sensor or an acceleration sensor. The shake detecting sensor 5 detects an angular velocity or acceleration in the lateral and vertical directions orthogonal to the optical axis and in the rotational direction around the optical axis, respectively.

An imaging unit 6 includes a fixed member 601 and a movable member 602, and has an image stabilizing apparatus that is a mechanism for correcting an image blur due to the shake of the camera body 1.

The fixed member 601 is fixed to an unillustrated housing of the camera body 1. The movable member 602 includes an image sensor 603, an imaging substrate 604, a communication substrate 605, and a second wireless communication unit 606.

The image sensor 603 includes a CCD or a CMOS sensor, and is mounted on the imaging substrate 604 (third substrate). Sporadic or continuous driving of the image sensor 603 can convert the optical image of the object condensed by the imaging lens 2 into an electric signal, and provide an image signal of a still image or a motion image.

The communication substrate 605 (second substrate) is disposed behind the imaging substrate 604. The communication substrate 605 is mounted with the second wireless communication unit 606 facing the first wireless communication unit 401, and configured to communicate with the control substrate 4. The imaging substrate 604 is connected to the communication substrate 605 by an FPC 607, and signals such as an image signal can be transmitted and received to and from the control substrate 4 by a wireless communication via the communication substrate 605.

The movable member 602 is movably fixed in a plane formed in the fixed member 601 via a plurality of steel balls 608 in a direction different from the optical axis (in a plane orthogonal to the optical axis in this embodiment). When the shake detecting sensor 5 detects the shake of the camera body 1, the image stabilization with the image blur on the image sensor 603 is provided by moving the movable member 602 based on the detection result.

The control substrate 4 and the communication substrate 605 are mounted with a first wireless power feeder 402 and a second wireless power feeder 609, respectively, and the power is supplied to the movable member 602 from the control substrate 4 by a known wireless power supply, such as an inductive coupling method and a capacitive coupling method.

This structure can eliminate a cable or FPC that electrically connect the control substrate 4 and the movable part 602 to each other, and make smaller the camera body 1.

A focal plane shutter 7 for adjusting a light amount incident on the image sensor 603 is disposed in front of the image sensor 603.

Figure 2:
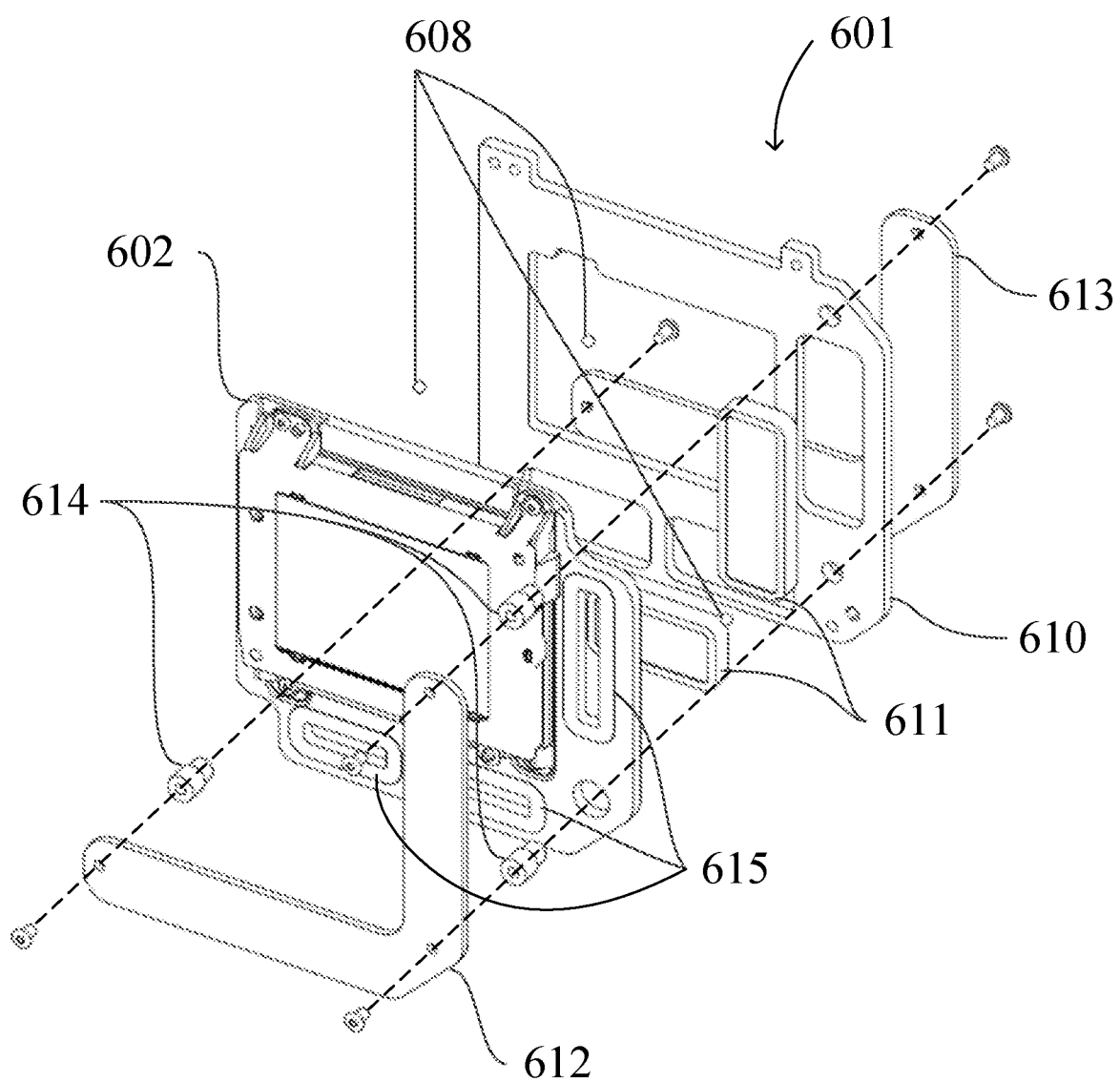
FIG. 2 is an exploded perspective view of an imaging unit according to this embodiment.

Referring now to FIG. 2, a description will be given of a structure of the imaging unit 6. FIG. 2 is an exploded perspective view of the imaging unit 6.

The fixed member 601 includes a fixed frame 610, three magnets 611, a movable side yoke 612, and a fixed side yoke 613. For example, the magnets 611 are disposed side by side in a plane in which the north pole and the south pole are orthogonal to the optical axis, and are bonded to the fixed frame 610. The movable side yoke 612 and the fixed side yoke 613 are made of a soft magnetic material such as iron and have a shape that covers the surface facing the magnet 611. The movable side yoke 612 is fixed to the fixing frame 610 via a spacer 614. The fixed side yoke 613 is disposed at a position facing the movable side yoke 612 via the magnet 611, and fixed to the fixed frame 610.

The movable member 602 is disposed between the fixed frame 610 and the movable side yoke 612. The movable member 602 includes three driving coils 615 at positions facing the magnets 611. Details of the movable member 602 will be described later.

Flowing the current through the driving coils 615 in the magnetic field of the magnet 611 can generate a Lorentz force in the driving coils 615, and move the movable member 602.

First Embodiment

Figure 3A:
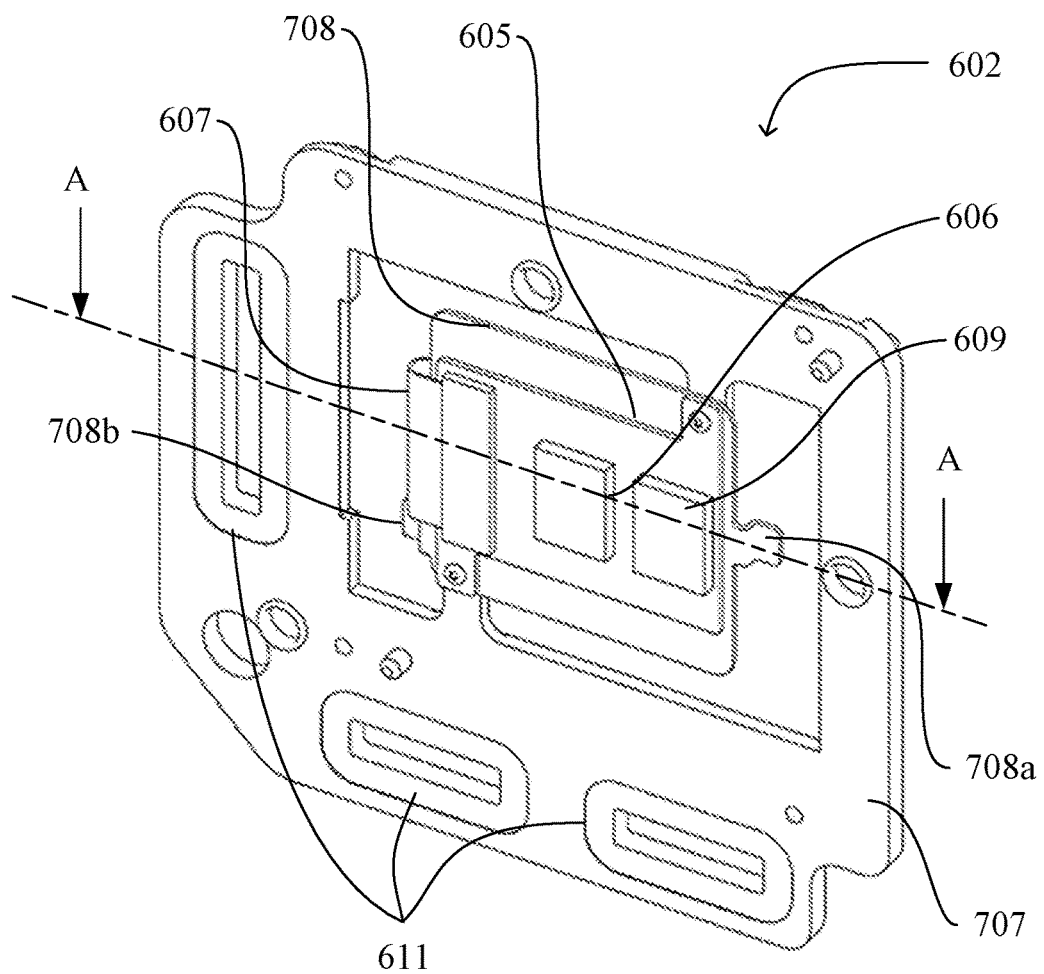
FIGS. 3A and 3B are perspective and sectional views of a movable member of the imaging unit according to the first embodiment, respectively.
Figure 3B:
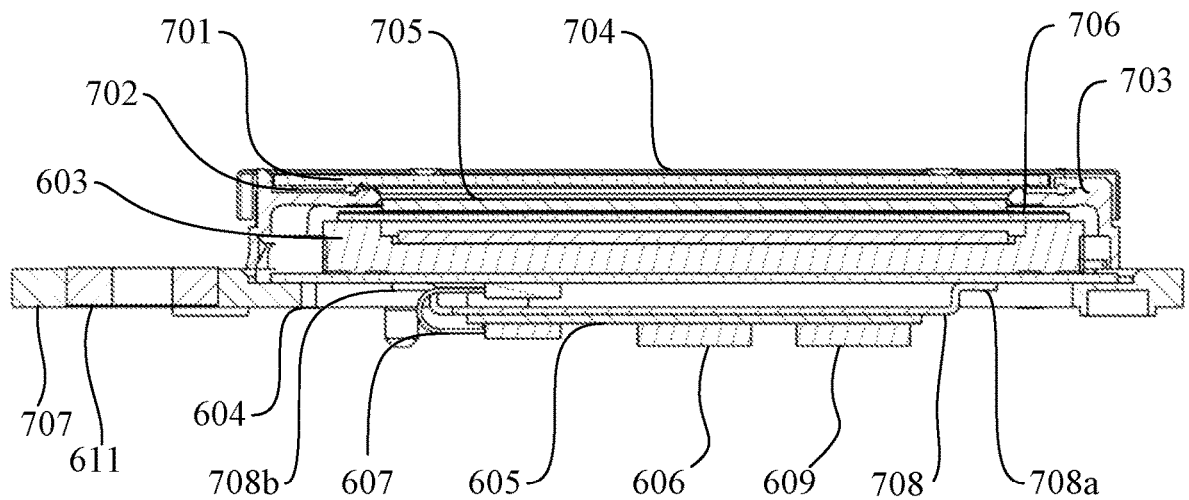

Referring now to FIGS. 3A and 3B, a detailed description will be given of the movable member 602 of the structure of the imaging unit 6 according to a first embodiment of the present disclosure. FIG. 3A is a perspective view of the movable member 602 according to this embodiment. FIG. 3B is a sectional view taken along a line A-A in FIG. 3A.

An optical low-pass filter 701 is a single birefringent plate made of quartz, and prevents components of the object image having a predetermined cutoff frequency or higher from being transmitted to the image sensor 603.

A piezoelectric element 702 is bonded to the optical low-pass filter 701. The piezoelectric element 702 is bonded to the optical low-pass filter 701 in parallel close to one of the four sides, and vibrates (expands and shrinks) mainly in the direction orthogonal to the optical axis when the voltage is applied to it. Thereby, the optical low-pass filter 701 can be resonated (vibrated) in a wavy shape so as to have a plurality of nodes parallel to the one side, and remove foreign matters attached to the surface of the optical low-pass filter 701.

The optical low-pass filter 701 is fixed by a low-pass holder 703 and a press sheet metal 704 so that the optical low-pass filter 701 can vibrate.

An infrared cut-off filter 705 is provided behind the optical low-pass filter 701 so as to prevent the infrared light from being transmitted to the image sensor 603.

A mask 706 is a light shielding member having a rectangular opening that determines a range of light incident on the image sensor 603. A double-sided tape is bonded to the front and back of the mask 706, which is bonded to the protective glass of the image sensor 603 on one side and to the infrared cut-off filter 705 on the other side.

A movable frame 707 is a member for fixing the low-pass holder 703, the magnets 611, and the imaging substrate 604.

The communication substrate 605 is disposed behind the imaging substrate 604. An (electromagnetic) shield member 708 (shield unit) is disposed between the imaging substrate 604 and the communication substrate 605. The communication substrate 605 and the shield member 708 are fixed to the movable frame 707.

The shield member 708 is formed of a sheet metal made of a heat conductive material, and has a shape (10.0 mm×20.0 mm) larger than the movable range (14.0 mm) of the movable member 602 during the image stabilization. Thereby, during the image stabilization, noise is prevented from being added to the captured image due to the noise of the electric signal obtained by the image sensor 603 caused by the electromagnetic field noises of the wireless communication unit and the wireless power feeder mounted on the control substrate 4 and the communication substrate 605. The first wireless communication unit 401 and the second wireless communication unit 606 are disposed so that their respective centers overlap the center of the optical axis. Therefore, a relative moving amount between the first wireless communication unit 401 and the second wireless communication unit 606 can be reduced when the rotation direction is corrected around the optical axis during the image stabilization. The shape of the shield member 708 can be reduced, and the weight of the imaging unit 6 can be reduced.

The imaging substrate 604 has an A/D conversion circuit for converting an analog image signal obtained from the image sensor 603 into digital image data.

Generally, when the camera is continuously driven, the image sensor 603 and the imaging substrate 604 become hot due to heat generated by the image sensor 603 and the A/D conversion circuit, and noise may be added to the electric signal obtained by the image sensor 603. The temperature biases in the imaging substrate 604 due to the bias of the heat generator in the image sensor 603 and the arrangement of the electronic components in the A/D conversion circuit.

The shield member 708 contacts a relatively high temperature portion of the imaging substrate 604 at one edge portion 708a, and a relatively low temperature portion of the imaging substrate 604 at another edge portion 708b. Since the shield member 708 is made of a heat conductive material, the heat is transferred from the high temperature portion to the low temperature portion of the imaging substrate 604. This configuration can suppress the temperature rise of the imaging substrate 604 when the camera is driven, and prevent noise from being added to the electric signal obtained by the image sensor 603, which is caused by the heat generated in the image sensor 603 and the imaging substrate 604.

Second Embodiment

Figure 4A:
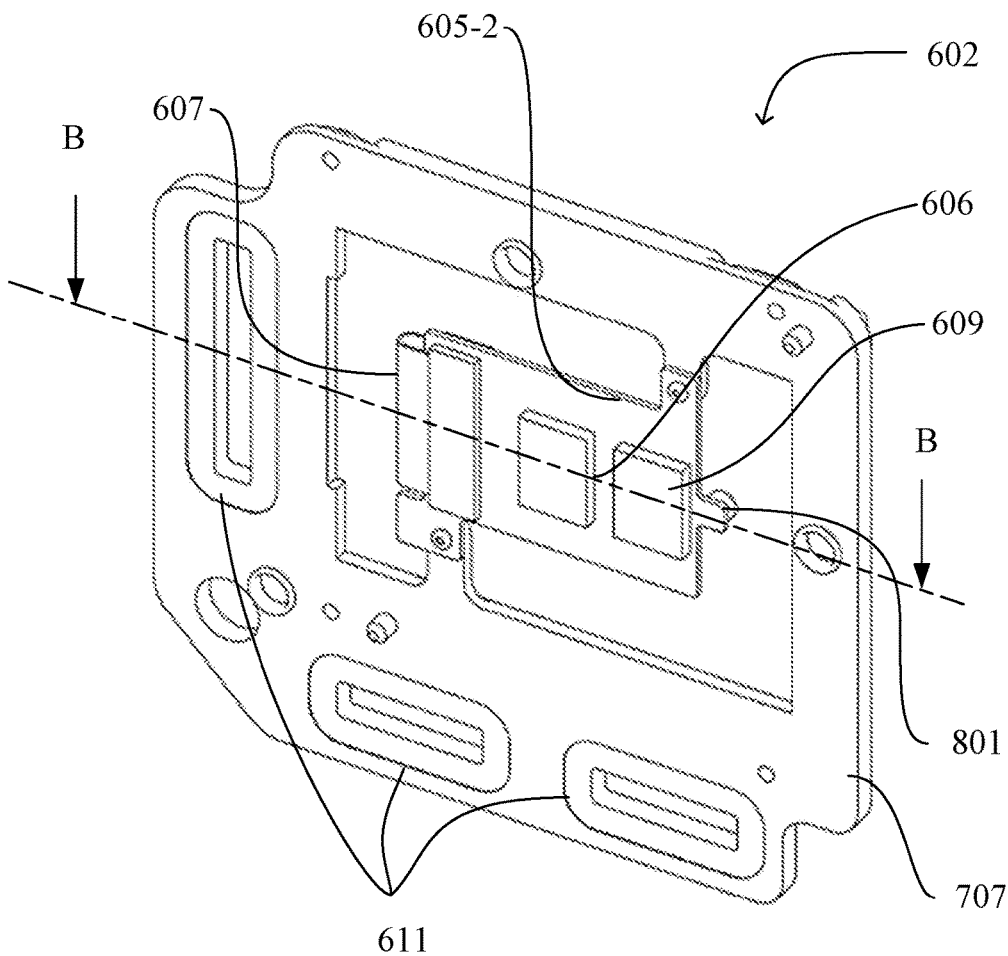
FIGS. 4A and 4B are perspective and sectional views of a movable member of the imaging unit according to the second embodiment, respectively.
Figure 4B:
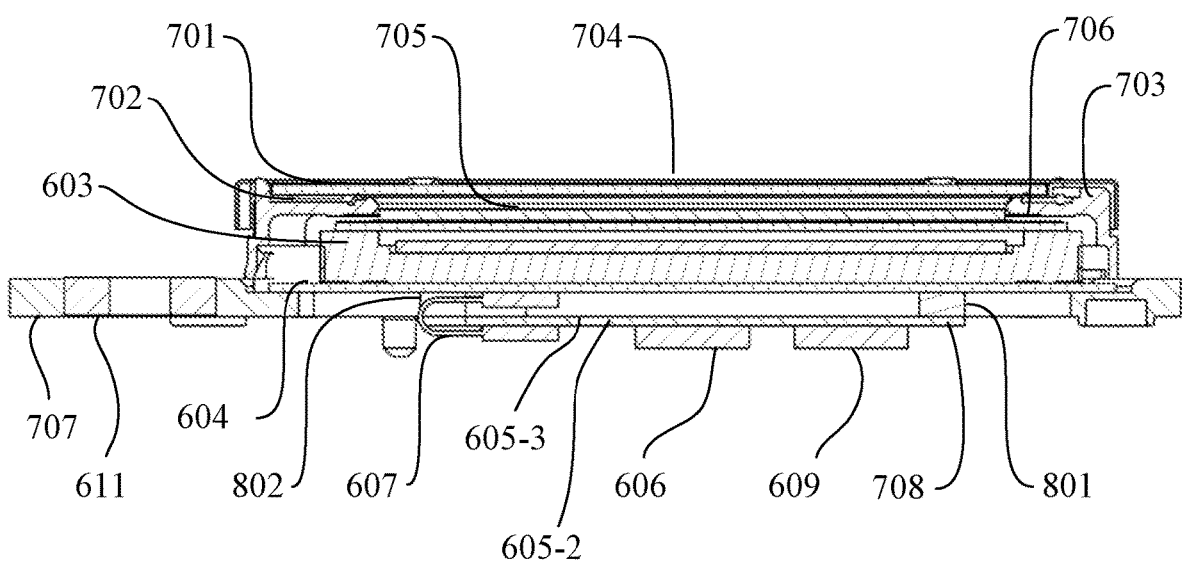
Figure 5:
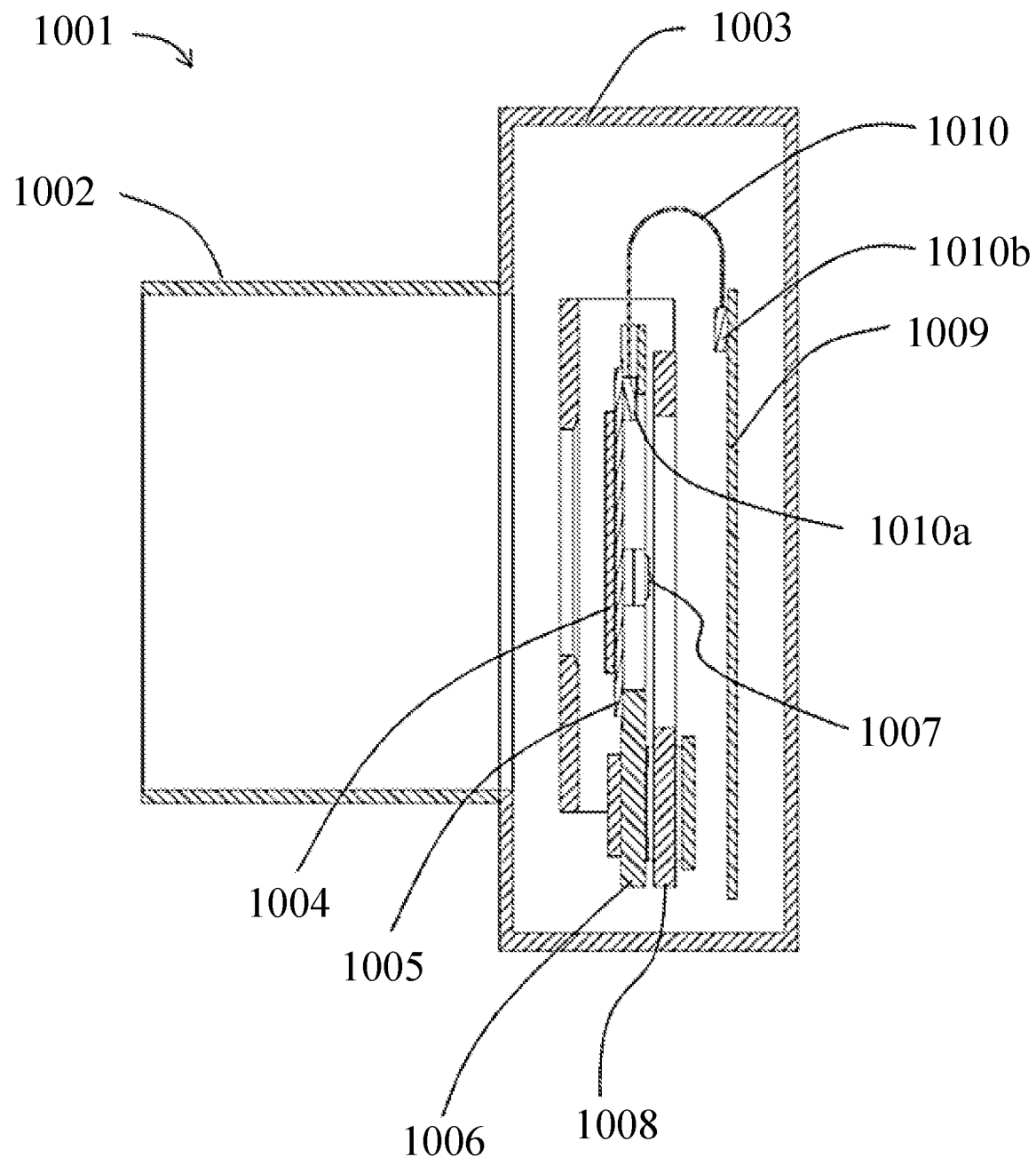
FIG. 5 is a sectional view of the conventional image pickup apparatus.

Referring now to FIGS. 4A and 4B, a detailed description will be given of the movable member 602 in the structure of the imaging unit 6 according to a second embodiment of the present disclosure. FIG. 4A is a perspective view of the movable member 602 according to this embodiment. FIG. 4B is a sectional view taken along a line B-B in FIG. 4A.

The image sensor 603, the imaging substrate 604, the optical low-pass filter 701, the piezoelectric element 702, the low-pass holder 703, the press sheet metal 704, the infrared cut-off filter 705, and the mask 706 are structured similarly to those of the first embodiment, and thus a description thereof will be omitted.

A communication substrate 605-2 is disposed behind the imaging substrate 604 and fixed to the movable frame 707. The communication substrate 605-2 is a multilayer board (multilayer PWB), and mounted with the second wireless communication unit 606 and the second wireless power feeder 609 on a surface facing the control substrate 4. A ground layer 605-3 (electromagnetic shield member) is disposed on the imaging substrate 604 side of the communication substrate 605-2. The ground layer 605-3 is provided on the side of the communication substrate 605-2 opposite to the second wireless communication unit 606. The ground layer 605-3 has a shape larger than the movable range of the movable member 602 during the image stabilization. Thereby, during the image stabilization, noise is prevented from being added to the captured image due to the noise of the electric signal obtained by the image sensor 603 caused by the electromagnetic field noises of the wireless communication unit and the wireless power feeder mounted on the control substrate 4 and the communication substrate 605-2. It is unnecessary to add a shield member in addition to the communication substrate 605-2, and the weight reduction of the imaging unit 6 can be promoted.

A heat conductive member 801 made of a soft material is bonded to the high temperature portion of the imaging substrate 604, and a heat conductive member 802 made of a soft material is bonded to the low temperature portion of the imaging substrate 604. The heat conductive members 801 and 802 contact the communication substrate 605-2. The ground layer 605-3 is exposed at the portions where the heat conductive members 801 and 802 contact the communication substrate 605-2, and the imaging substrate 604 and the ground layer 605-3 of the communication substrate 605-2 are thermally connected to each other via the conductive members 801 and 802. This structure can suppress the temperature rise of the imaging substrate 604 when the camera is driven, and prevent noises from being added to the electric signal obtained by the image sensor 603, which are caused by the heat generated by the image sensor 603 and the imaging substrate 604.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

For example, the communication substrate 605-2 may not be fixed to the movable frame 707, but may be fixed to the imaging substrate 604 via a metal spacer. Disposing the metal spacer in the high temperature portion and the low temperature portion of the imaging substrate 604 can thermally connect the imaging substrate 604 and the communication substrate 605-2 with each other via the metal spacer without the heat conductive members 801 and 802 made of the soft material.

The embodiment can provide an image stabilizing apparatus that can suppress a noise in an image signal caused by wireless communications between substrates.

This application claims the benefit of priority from Japanese Patent Application No. 2020-088294, filed on May 20, 2020, which is hereby incorporated by reference herein in its entirety.

What is claimed is:

1. An image stabilizing apparatus comprising:
   a first wireless communication unit;
   a second wireless communication unit configured to communicate with the first wireless communication unit and disposed to face the first wireless communication unit;
   a first substrate mounted with the first wireless communication unit;
   a second substrate mounted with the second wireless communication unit;

a third substrate provided opposite to the first substrate with respect to the second substrate in an optical axis direction and mounted with an image sensor;

an electromagnetic shield member provided between the second substrate and the third substrate; and an image stabilizing unit that provides an image stabilization by moving the second and third substrates relative to the first substrate in planes formed in directions different from the optical axis.

2. The image stabilizing apparatus according to claim 1, wherein the shield member is made of a heat conductive material.

3. The image stabilizing apparatus according to claim 1, wherein the shield member is made of sheet metal.

4. The image stabilizing apparatus according to claim 1, wherein the shield member thermally contacts a high temperature portion and a low temperature portion on the third substrate.

5. The image stabilizing apparatus according to claim 1, wherein the second substrate is a multilayer substrate, and wherein the shield member includes a ground layer of the second substrate.

6. The image stabilizing apparatus according to claim 5, wherein the second wireless communication unit is mounted on the second substrate on a side facing the first substrate, and wherein the ground layer in the second substrate is provided on a side opposite to the second wireless communication unit and on a side facing the third substrate.

7. The image stabilizing apparatus according to claim 5, wherein the third substrate includes a heat conductive member at each of a high temperature portion and a low temperature portion, and the heat conductive member thermally contacts the ground layer.

8. The image stabilizing apparatus according to claim 1, wherein the first substrate includes a first wireless power feeder, wherein the second substrate includes a second wireless power feeder, and wherein the second wireless power feeder is provided on a side facing the first substrate.

9. The image stabilizing apparatus according to claim 1, wherein a center of each of the first wireless communication unit and the second wireless communication coincides with the optical axis.

10. The image stabilizing apparatus according to claim 1, wherein the electromagnetic shield member is larger than a movable range of the image stabilizing unit.

11. An image pickup apparatus comprising:

an image sensor; and an image stabilizing apparatus, wherein the image stabilizing apparatus includes:

a first wireless communication unit;

a second wireless communication unit configured to communicate with the first wireless communication unit and disposed to face the first wireless communication unit;

a first substrate mounted with the first wireless communication unit;

a second substrate mounted with the second wireless communication unit;

a third substrate provided opposite to the first substrate with respect to the second substrate in an optical axis direction and mounted with an image sensor; and an electromagnetic shield member provided between the second substrate and the third substrate; and an image stabilizing unit that provides an image stabilization by moving the second and third substrates relative to the first substrate in planes formed in directions different from the optical axis.

\* \* \* \* \*